2,862,920
FERROUS CARBOXYMETHYL DEXTRAN

Carl Berger and Leo J. Novak, Dayton, Ohio, assignors to The Commonwealth Engineering Company of Ohio, Dayton, Ohio, a corporation of Ohio No Drawing. Application June 7, 1956
Serial No. 589,885

2 Claims. (Cl. 260—209)

This invention relates to acid-insoluble, alkali-soluble carboxymethyl dextran-iron complexes.

One object of the invention is to provide carboxymethyl dextran-iron complexes which are insoluble in hydrochloric acid and soluble in aqueous alkaline solutions at pH 8.0 to 8.5, and to a method of making the same.

The new complexes are obtained in accordance with the invention by reacting a carboxymethyl dextran with ferrous or ferric chloride in aqueous medium in the relative proportions of 5 to 10 parts by weight of the iron chloride to one part of the carboxymethyl dextran.

The carboxymethyl dextran used in preparing the new complexes is a dextran ether containing an average of not less than about 1.0 up to a maximum of 3.0, preferably 1.0 to 1.5, carboxymethyl groups per anhydroglucose unit.

The conditions for the production of these carboxymethyl dextrans are critical. Thus, it is found that carboxymethyl dextrans containing a minimum of 1.0 carboxymethyl group per anhydroglucose unit cannot be obtained from an intermediate sodium or other alkali metal substituted dextran produced by treating dextran with the alkali metal alcoholate in non-aqueous alcoholic medium.

The products obtained by treating dextran with an alkali metal alcoholate such as sodium methylate, in methanol, contain only traces of the alkali metal, insufficient to noticeably modify the properties of the parent dextran. Products derived from the dextrans containing the traces of alkali metal, by replacement of the alkali metal with other substituent groups, contain only traces of such other groups.

Thus, it has been found that when dextran is first treated with sodium or other alkali metal alcoholate, in alcohol, and then treated with chloracetic acid, the product contains so few carboxymethyl groups that the properties thereof are not distinguishable from those of the parent dextran. The degree of substitution is, as a maximum, 0.2–0.3 carboxymethyl group per anhydroglucose unit, and the product does not alter the viscosity of water to any measurable extent. This can be determined by means of the Brookfield viscometer.

In contrast, the carboxymethyl dextrans used in preparing the present complexes and containing an average of 1.0 carboxymethyl group per anhydroglucose unit increase the viscosity of water remarkably and even form gels in the presence of water in small concentrations of about 0.5% by weight.

The carboxymethyl groups are not introduced into the dextran molecule to impart water-solubility to the dextran since the dextran used is inherently water-soluble or water-dispersible. The purpose of the ether modification is to alter the characteristics of the dextran in water or aqueous media, which has an effect on the rate of release of the iron from the complex in the presence of water.

The carboxymethyl dextrans used in preparing the present iron complexes are obtained by treating dextran with an excess of sodium or potassium chloracetate in solution or suspension in aqueous sodium or potassium hydroxide at 50° C. to 100° C. for one-half hour to two hours.

The molar ratio of sodium or potassium chloracetate to dextran used in preparing the carboxymethyl dextran is between 2:1 and 12:1. The molar ratio of sodium or potassium hydroxide to dextran used is between 5:1 to 15:1. The molar ratio of water to dextran used is between 70:1 and 120:1.

The initial product of the reaction is the sodium or potassium salt of the carboxymethyl dextran. It may be precipitated from the viscous reaction mass by a non-solvent therefor such as any water-miscible alcohol, e. g., methyl, ethyl, propyl, isopropyl or t-butyl alcohol, or by a water-miscible ketone such as acetone, and separated from the water-precipitant phase by filtration.

The free carboxymethyl dextran may be obtained by mixing the salt with water, acidifying to a pH of about 3.0, and precipitating the ether by means of one of the water-miscible alcohols or ketones.

The following is an example of the production of carboxymethyl dextran containing an average of about 1.0 carboxymethyl groups per anhydroglucose unit and which is useful in preparing the iron complexes of the present invention.

About 100 parts of native *Leuconostoc mesenteroides* B–512 dextran were dissolved in 700 parts of water and the solution was added to about 150 parts of water containing 150 parts of sodium hydroxide, with stirring, to obtain solution A.

Separately, about 220 parts of monochloracetic acid were dissolved in 400 parts of water and about 112.3 parts of anhydrous sodium carbonate were added slowly to the solution, to obtain solution B.

Solutions A and B were mixed together with agitation and the mass was held for one hour at 65° C. The mass was then adjusted to pH 3.0 with hydrochloric acid and then poured slowly into 1500 parts by volume of methanol to precipitate the carboxymethyl dextran, which was redissolved in 2000 parts by volume of water. The carboxymethyl dextran was reprecipitated by pouring it into 2000 parts by volume of methanol. The precipitated pasty mass was passed through pressure squeeze rolls into 300 parts by volume of pure methanol, allowed to stand for two hours and then passed again through the squeeze rolls. The carboxymethyl dextran was dried under vacuum and ground to fine particle size. It contained an average of about 1.0 carboxymethyl group per anhydroglucose unit.

The conditions, particularly the reaction time, are adjusted when a D. S. higher than 1.0, and up to the possible maximum of 3.0, is desired.

The dextran used in preparing this carboxymethyl ether is that classified as *L. m.* B–512 according to the Northern Regional Research Laboratory classification system. The dextrans are classified according to the strain of micro-organism, such as those of the *Leuconostoc mesenteroides* or *L. dextranicum* types, cultivated to produce the enzyme dextransucrase which acts on sucrose to convert it to dextran. Any of the native NRRL dextrans which are water-soluble or readily inherently water-dispersible may be treated in the manner described to obtain a carboxymethyl dextran for use in producing the present ferric and ferrous complexes.

Instead of the native, unhydrolyzed dextrans there may be used hydrolyzates having molecular weight between 2000 and that of the native dextran.

Briefly, the iron complexes are obtained by mixing the selected carboxymethyl dextran containing an average of about 1.0 to 3.0, preferably 1.0 to 1.5 carboxymethyl groups per anhydroglucose unit with water to form a high viscosity or jelly-like mass, adding the mass to an aqueous solution of the iron chloride, and holding the mass at room temperature until the complex precipitates, after which the precipitate is recovered and purified.

The following examples are given to illustrate the invention, it being understood that the examples are not intended as limitative.

Example I

Forty parts by weight of ferrous chloride were dissolved in 50 parts by volume of distilled water with vigorous stirring while carbon dioxide gas was bubbled through the solution to prevent oxidation of ferrous ion. This solution had a pH of about 2.0.

Five parts by weight of carboxymethyl dextran D. S. 1.0 (derived from native *Streptobacterium dextranicum* B–1254) were stirred into 50 parts by volume of water. The resulting mass had the consistency of a thick, homogeneous jelly or paste and a pH of about 3.0. It was added slowly, over a period of 10 minutes, to the aqueous ferrous chloride with vigorous stirring and the passage of $CO_2$ gas through the solution for a period of one hour after all of the carboxymethyl dextran had been added. The final solution had a pH of about 2.7.

A red gelatinous precipitate formed and was allowed to settle for an hour and a half. The green supernatant was decanted and the gelatinous mass was suction-filtered to free it of excess ferrous chloride tetrahydrate solution. To remove all ferrous ion and water and reduce the gelatinous mass to a powder, the mass was dropped into 500 parts by volume of methanol and stirred vigorously for five minutes. The precipitate was allowed to settle and the supernatant was decanted off. This procedure was repeated four times until the supernatant was only slightly tinged with yellow by ferrous ion. The powder or granular material was suction-filtered and dried in a vacuum oven for 24 hours without heating and at a pressure of about 5″.

The brown, granular ferrous carboxymethyl dextran contained, by analysis, about 11% by weight of iron. It was insoluble in hydrochloric acid at pH 1.6–1.8, and soluble in aqueous alkaline solution at pH 8.0–8.5.

Example II

Ferric carboxymethyl dextran was prepared as in Example I, using forty parts by weight of ferric chloride, except that carbon dioxide was not bubbled in. The ferric carboxymethyl dextran contains, by analysis, about 12% of iron.

Example III

Other water-soluble or water-dispersible native dextran types (*L. m.* B–1064, B–1414, B–1145, B–640, B–1066, B–1210, B–1211, B–1308, B–1209, and B–1119) and hydrolyzates thereof having molecular weights of 5000 to 500,000 were reacted with the iron chlorides in the proportions of 1:5 to 1:10 as described in the examples to obtain complexes containing from 5% to 20% by weight of iron.

The new iron complexes have various uses. For example, the complexes may be used as soil conditioners. The capacity of the carboxymethyl dextran portion of the complex to form a gel in water is of value in that connection, assisting in binding the soil particles into readily workable, small aggregates. Also, the ability of the carboxymethyl dextran to absorb very large amounts of water from the soil, with liberation of the iron, affords an effective control for the rate of liberation of the iron from the complex to the soil.

Since some changes and modifications may be made in practicing the invention without departing from the spirit and scope thereof, it is to be understood that it is not intended to limit the invention except as defined in the appended claims.

What is claimed is:

1. A method for producing a ferrous carboxymethyl dextran complex which is insoluble in aqueous acid solution but readily soluble in aqueous alkaline solution at pH 8.0 to 8.5, comprising slowly adding an aqueous dispersion of a carboxymethyl ether of water-dispersible dextran having a molecular weight between 2000 and that of native, unhydrolyzed, microbiologically produced dextran containing an average of about 1.0 to 3.0 carboxymethyl groups per anhydroglucose unit, which dispersion has the consistency of a jelly, to an aqueous solution of ferrous chloride with vigorous stirring and the passage of carbon dioxide gas through the reaction medium to inhibit oxidation of ferrous ion, the relative proportions by weight of the carboxymethyl dextran and ferrous chloride being from 1:5 to 1:10, holding the resulting fluid mass at room temperature until a gelatinous precipitate comprising the ferrous complex forms and settles, separating the gelatinous precipitate from the supernatant, reprecipitating the complex by mixing the gelatinous precipitate with methanol with vigorous stirring, separating the precipitate, and repeating the reprecipitation from methanol until the supernatant is substantially colorless and a brown colored ferrous carboxymethyl dextran complex is obtained in granular condition.

2. As a new product an iron complex of carboxymethyl dextran in which the carboxymethyl dextran contains an average of about 1.0 to 3.0 carboxymethyl groups per anhydroglucose unit, said complex being selected from the group consisting of ferric and ferrous iron complexes of the ether which are insoluble in aqueous acid solution of pH 1.6 to 1.8 but readily soluble in aqueous alkaline solution at pH 8.0 to 8.5, and being produced by the method of claim 1.

References Cited in the file of this patent

UNITED STATES PATENTS

| Number | Name | Date |
| --- | --- | --- |
| 2,539,417 | Grassie | Jan. 30, 1951 |
| 2,599,620 | Filbert | June 10, 1952 |
| 2,599,771 | Moe | June 10, 1952 |
| 2,609,368 | Gaver | Sept. 2, 1952 |
| 2,618,633 | Vaughan | Nov. 18, 1952 |
| 2,644,815 | Gronwall | July 7, 1953 |
| 2,671,779 | Gaver et al | Mar. 9, 1954 |